United States Patent
Augustyn

(10) Patent No.: US 7,681,939 B2
(45) Date of Patent: Mar. 23, 2010

(54) COLLAPSIBLE ARMREST FOR A VEHICLE DOOR

(75) Inventor: Nicholas H. Augustyn, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 12/103,422

(22) Filed: Apr. 15, 2008

(65) Prior Publication Data

US 2009/0256374 A1 Oct. 15, 2009

(51) Int. Cl.
*B60J 5/00* (2006.01)

(52) U.S. Cl. .................. 296/146.7; 296/187.05
(58) Field of Classification Search .......... 296/146.7, 296/1.09, 146.1, 37.13, 153; 280/751; 297/411.2, 297/411.21, 227
See application file for complete search history.

(56) References Cited

U.S. PATENT DOCUMENTS

| | | | | |
|---|---|---|---|---|
| 1,996,480 | A * | 4/1935 | Menton | 296/153 |
| 4,562,025 | A * | 12/1985 | Gray | 264/126 |
| 4,783,114 | A | 11/1988 | Welch | |
| 4,919,470 | A * | 4/1990 | Muller | 296/153 |
| 5,040,335 | A * | 8/1991 | Grimes | 49/502 |
| 5,073,318 | A * | 12/1991 | Rohrlach et al. | 264/46.5 |
| 5,181,759 | A | 1/1993 | Doolittle | |
| 5,224,299 | A * | 7/1993 | Abe | 49/502 |
| 5,297,842 | A * | 3/1994 | Hayashi | 296/146.7 |
| 5,387,390 | A * | 2/1995 | Kornylo | 264/46.8 |
| 5,445,430 | A | 8/1995 | Nichols | |
| 5,527,084 | A | 6/1996 | Scherf et al. | |
| 5,837,172 | A * | 11/1998 | Pritchard et al. | 264/46.4 |
| 5,885,662 | A * | 3/1999 | Gardner, Jr. | 427/426 |
| 6,248,200 | B1 * | 6/2001 | Dailey et al. | 156/245 |
| 6,447,047 | B1 * | 9/2002 | Marcovecchio et al. | 296/146.7 |
| 6,568,743 | B1 * | 5/2003 | Jayasuriya et al. | 296/153 |
| 6,594,955 | B1 * | 7/2003 | Delire et al. | 49/502 |
| 6,656,397 | B1 * | 12/2003 | Hansen et al. | 264/45.4 |
| 6,742,830 | B2 | 6/2004 | Zimmerman et al. | |
| 6,893,077 | B1 * | 5/2005 | DeJongh | 296/187.05 |
| 7,005,092 | B2 * | 2/2006 | Dooley et al. | 264/46.5 |
| 7,104,590 | B2 | 9/2006 | Dooley et al. | |
| 7,121,611 | B2 | 10/2006 | Hirotani et al. | |
| 7,503,621 | B2 * | 3/2009 | Mani | 296/187.05 |
| 2004/0229013 | A1 * | 11/2004 | Dooley et al. | 428/138 |

(Continued)

*Primary Examiner*—Kiran B. Patel
(74) *Attorney, Agent, or Firm*—Gifford, Krass, Sprinkle, Anderson & Citkowski, P.C.

(57) ABSTRACT

Provided is an armrest assembly disposed on an inner door panel of a vehicle. The armrest assembly includes an armrest panel shaped to form the body of the armrest, and a support surface made of flexible skin. The armrest panel is fixed to a predetermined location on the inner door panel, and extends upwardly and away from the inner door panel to a proximal end. The proximal end is spaced apart and opposite the inner door panel to define an cavity. The flexible skin is attached to the proximal end and pulled taut over the cavity and fixed to the inner door panel to form the support surface for receiving the load of a passenger arm. The armrest assembly having the flexible skin for a support surface is able to fold into itself when the vehicle door is subject to a predetermined load, thus presenting no rigid structure posing a threat of being pushed into a passenger under said predetermined load.

7 Claims, 3 Drawing Sheets

U.S. PATENT DOCUMENTS

2005/0023861 A1* 2/2005 Hirotani et al. ........ 296/187.05
2006/0082175 A1* 4/2006 Cowelchuk et al. ........ 296/1.09
2006/0154028 A1* 7/2006 Dooley et al. ................ 428/138
2009/0134659 A1* 5/2009 Hall et al. ................ 296/146.7

* cited by examiner

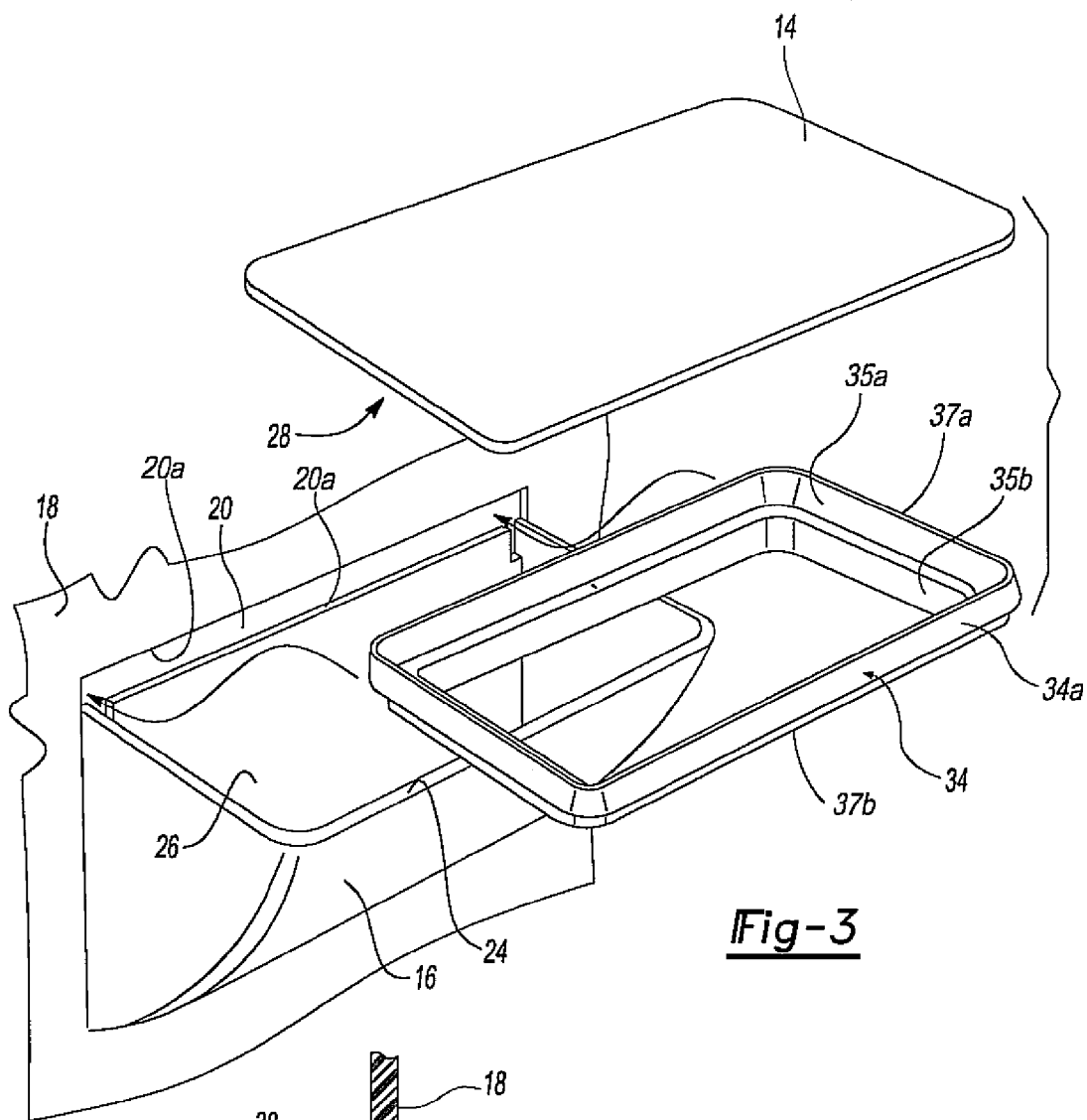
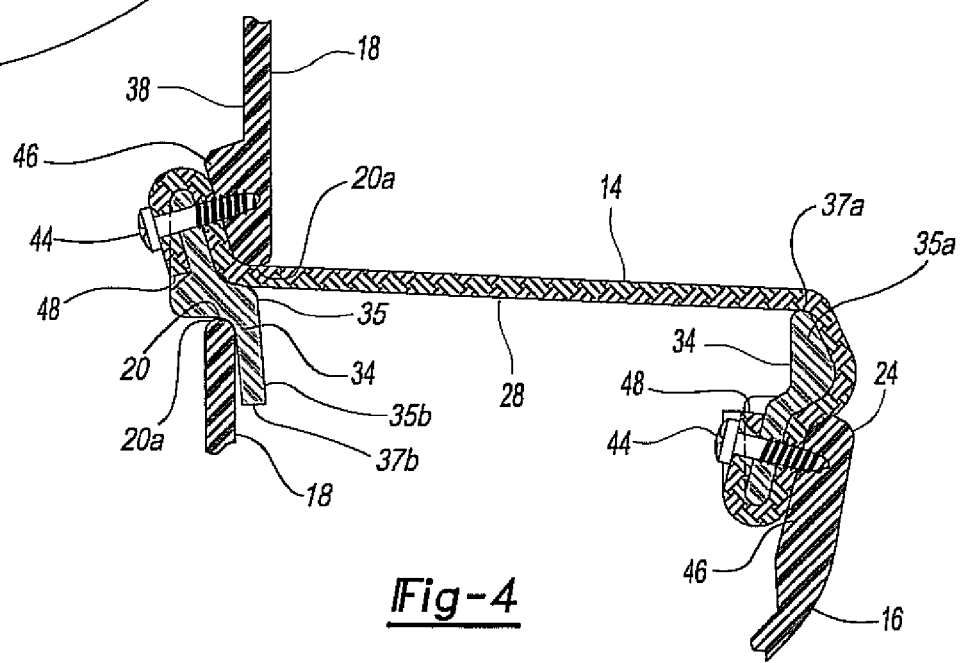

COLLAPSIBLE ARMREST FOR A VEHICLE DOOR

FIELD OF THE INVENTION

The present invention relates generally to a collapsible armrest assembly having an arm support surface of a sufficient predetermined tension for supporting an occupant's arm while being able to fold onto itself to prevent further damage to an occupant during a vehicle side collision.

BACKGROUND OF THE INVENTION

Armrests located on a vehicle door that extend inwardly from the door to provide a support for an occupant's arm to rest upon are well known and documented. Such armrests can be a separate structure attached to the door, or can be integrated into the door itself. Armrest assemblies of the type described above are substantially rigid structures that generally include a rigid supporting substrate covered by foam pad or cushion for softness. The rigid supporting substrate provides a load bearing surface directed to hold an occupant's arm and is generally parallel to the vehicle floor and extends from the vehicle door towards the interior space of a vehicle. The rigid substrate can be pushed into the side of an occupant during a vehicle side collision, and therefore, attempts have been made to weaken the rigid substrate such that it absorbs side impact. For example, past models of the Toyota Camry have weakening beads placed along the rigid substrate. The weakening beads cause the substrate to bend and absorb energy when the armrest is pushed into a passenger's side during a side collision having a predetermined force. Other examples of such armrests are provided below.

U.S. Pat. No. 7,121,611 to Hirotani et al. discloses an armrest having a support surface extending substantially horizontally in the direction of a trim body toward the inside of the vehicle. The support surface is further supported by a rigid substrate. A weak portion is provided between the trim body portion and the support surface that promotes deformation with respect to a lateral load.

U.S. Pat. No. 6,742,830 to Zimmerman et al. discloses a vehicle door armrest having an inner contoured piece of molding forming a support surface for an occupant's arm. The molding is one piece and is made of various layers of different material to provide predetermined shock absorption and deformation qualities.

U.S. Pat. No. 5,527,084 to Scherf discloses a vehicle armrest attached to the interior surface of a vehicle door. The armrest has a base fixed to the interior surface of the vehicle door and a rigid panel extending generally perpendicular to the base. The rigid panel forms a support surface for an occupant's arm and is disposed on the upper portion of the base. The underside of the rigid panel has a plurality of notches. The lower portion of the base has a plurality of ribs spaced apart and angled from each other. The ribs extend from the base to the underside of the panel and each rib is registered to one of the plurality of notches. Break lines are provided between each notch, thus the armrest collapses as it experiences a load from a side impact.

U.S. Pat. No. 5,181,759 to Doolittle discloses a vehicle armrest located on the interior side of a vehicle door having a tether or a cable to allow the armrest to collapse between the door and the occupant when the occupant exerts an outward force to open the door. However, the armrest is tensioned to transmit the load from the armrest to the door when an occupant pulls on the armrest to close the door.

U.S. Pat. No. 5,445,430 to Nichols discloses a collapsible armrest on a vehicle door presenting a generally planar surface for supporting an occupant's arm. The armrest has a trim panel, a foam layer and an undulating insert. The undulating insert presents an undulating surface, and the foam is shot on top of the undulating insert to present a planar surface. The planar surface is covered by the tri panel for aesthetic purposes. The armrest absorbs side impact by having the foam layer absorb energy and the undulating insert collapse under a predetermined load.

As stated above, these types of armrests not only provide support for an occupant's arm but are directed to absorb energy from a side impact to mitigate damage to an occupant. All of the armrests disclosed above do so by incorporating a weakened rigid substrate that extends laterally from the vehicle door towards the occupant. However, the weakened rigid substrate still poses a potential risk of injury to an occupant as the substrate is still pushed into the side of an occupant during a side impact of predetermined force. Thus it is desirable to have an armrest that can provide support for an occupant's arm without having a laterally extending substrate.

SUMMARY OF THE INVENTION AND ADVANTAGES

Provided is an armrest for an automobile door. The armrest is disposed on the interior surface of a vehicle door and includes an inner door panel having a slot, and an armrest panel shaped to form the body of an armrest. The armrest panel may be integrated into the door or fixed thereon. The lower portion of the armrest panel is fixed to a predetermined location on the inner door panel and extends upwardly and away from the inner door panel to a proximal end. The proximal end is horizontally spaced apart from the slot of the door along the same horizontal plane to define an cavity therebetween. A flexible skin is mounted to the panel at the proximal end of the armrest panel and is stretched across the cavity into the slot, and fixed onto the door to form a suspended surface for supporting an occupant's arm.

Backing members may be included to provide more support for the flexible skin. Each backing member squeezes a portion of the flexible skin against a portion of the proximal end and the hidden surface of the inner panel adjacent the slot. In another particular embodiment, a looped structure may be used, the looped structure shaped to form the support surface of the armrest, i.e. to be fittingly received over the cavity. The flexible skin is pulled taut over the looped structure, thereby forming the support surface of the armrest. The support surface is then fittingly secured over the cavity such that one portion of the support surface is nestled within the slot, and the opposite portion of the support surface abuts against the proximal end.

Accordingly, an armrest for the inner door panel of a vehicle is provided, the armrest having a support surface made of flexible skin. The armrest is capable of folding into itself and thus does not present a rigid substrate which may be further pushed into a passenger's side during the event of a side impact of a predetermined load.

BRIEF DESCRIPTION OF THE DRAWINGS

Advantages of the present invention is readily appreciated as the same becomes better understood by reference to the following detailed description when considered in connection with the accompanying drawings, wherein:

FIG. 3 is an exploded view of the collapsible armrest, showing the skin suspended above the looped structure, and the looped structure suspended above the armrest panel, with arrows showing how the looped structure is mounted onto the armrest panel;

FIG. 4 is an enlarged view of the area enclosed by the dashed lines shown in FIG. 2 showing the flexible skin attached to the armrest assembly;

DETAILED DESCRIPTION OF THE INVENTION

Figure 1:
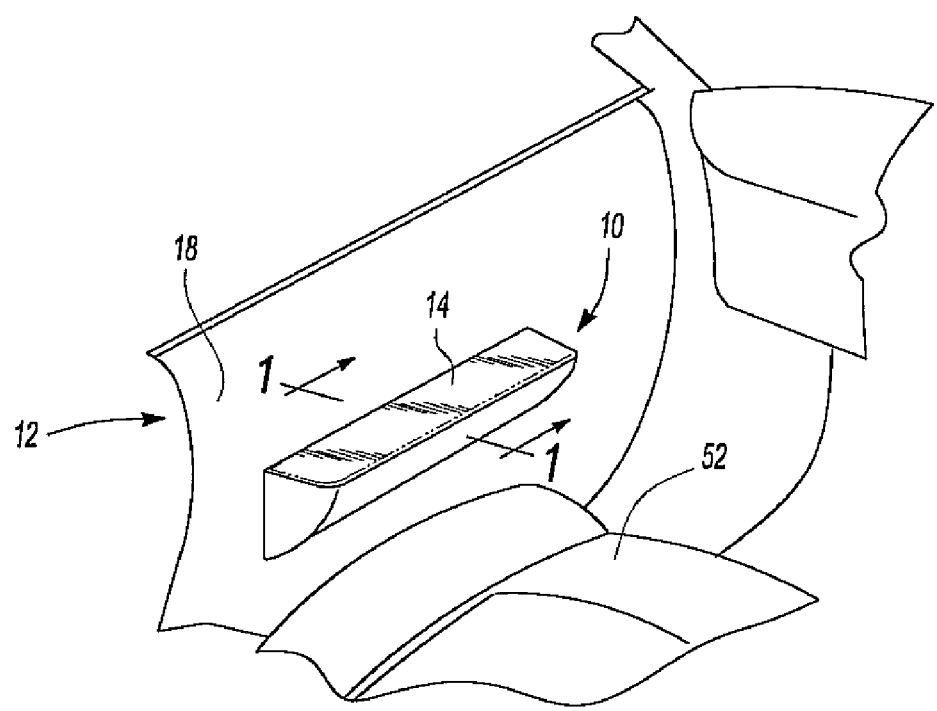
FIG. 1 is a partial perspective view of the interior space of a vehicle having a collapsible armrest.

An armrest assembly 10 located on the interior side of a vehicle door 12, wherein the armrest assembly 10 is collapsible during a side impact of predetermined force but still has a support surface 14 that can support the weight of an occupant's arm is provided. Specifically, the armrest assembly 10 has an armrest panel 16 shaped to form the body of the armrest. The armrest panel 16 is fixed or integral to the inner door panel 18 of the vehicle. The inner door panel 18 of the vehicle includes an inner wall surface 18a, an outer wall surface 18b, and also has a slot 20 disposed at a predetermined location therein. The slot 20 extends horizontally along the inner door panel 18. The armrest panel 16 is mounted to the inner wall surface 18a of the inner door panel and has a lower portion 22 extending upwardly and away from the inner door panel 18 to a proximal end 24. The proximal end 24 is spaced horizontally apart from the slot 20 and lies along the same horizontal plane of the slot 20 to define a cavity 26. The slot has an inner peripheral edge 20a. The armrest assembly 10 includes a support surface 14 made of a flexible skin 28 extending from the proximal end 24 and into the slot 20, thereby covering the cavity 26. The flexible skin 28 is made from a sheet of flexible material. One end of the flexible skin 28 is attached to the proximal end 24 of the armrest panel 16 and the other end of the flexible skin 28 is attached to the inner door panel 18. The flexible skin 28 extends across the opening of the cavity 26 along a generally horizontal place so as to be in communication with the opening of the cavity 26. More specifically, the flexible skin 28 is mounted within the slot 20 and a portion of the flexible skin 28 is folded about a portion of the inner peripheral edge 20a and fixed to the inner door panel 18. The armrest assembly 10 having the flexible skin 28 is capable of completely folding into itself when the vehicle is subjected to a predetermined load placed upon the side of the vehicle.

Referring now to the drawings, FIG. 1 is a perspective view of the driver's side of a vehicle compartment having a door 12 that is equipped with an armrest assembly 10. The armrest assembly 10 is attached to the door 12 at a predetermined location upon where a passenger sitting in a seat 52 may be able to rest his arm thereon. The armrest assembly 10 has a support surface 14 for supporting the weight of a vehicle occupant's arm. The support surface 14 is made of a flexible skin 28 pulled taut over the cavity 26 and having a predetermined tension capable of supporting said arm without unwanted sagging.

Figure 2:
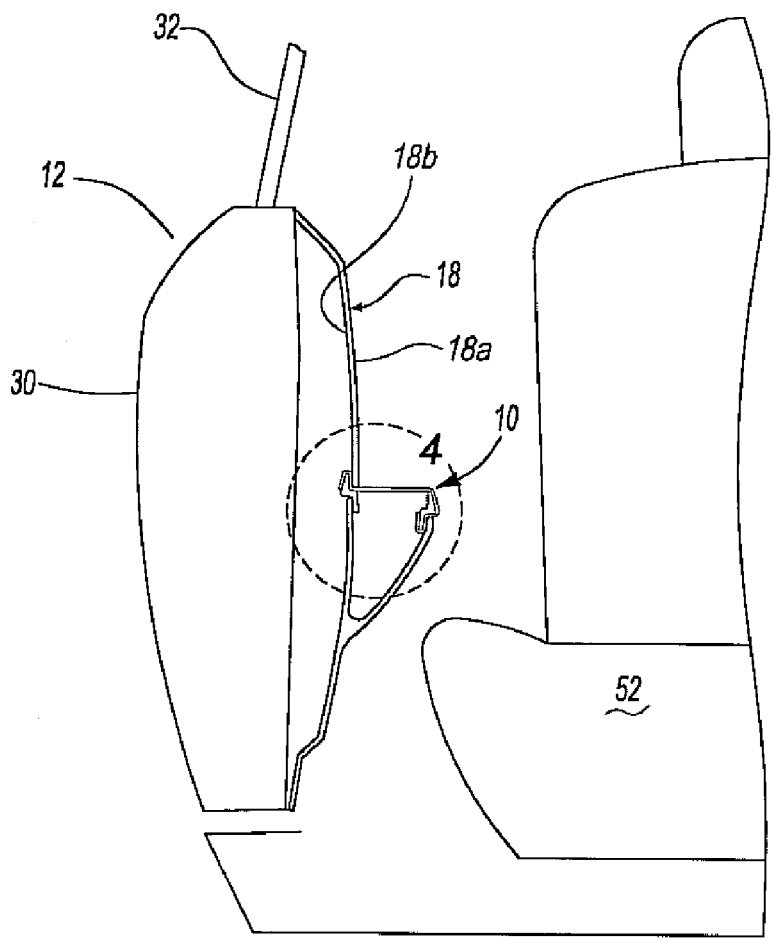
FIG. 2 is a cross-sectional view of the of FIG. 1 taken along line 1-1.

Referring to FIG. 2, there is shown a cross sectional view of the door 12 taken along lines 1-1. The door 12 has an outer door panel 30 and an inner door panel 18 together defining the shape of the door 12. Both panels 18 and 30 are attached together at their respective edges and the remaining body of the inner door panel 18 is spaced apart from the remaining body of the outer door panel 30. The space defined between the outer panel and inner panel provides a storage area for vehicle accessories such as a window pane 32, air vents, electrical wiring, and the like. The interior surface of the inner door panel 18 may be covered with a trim panel (not shown) for aesthetic purposes.

With reference to FIG. 3, a first preferred embodiment of the collapsible armrest assembly 10 is provided. The proximal end 24 is shown spaced horizontally apart from the slot 20 of the inner door panel 18, defining a cavity 26 having a shape of an armrest support surface 14. The flexible skin 28 is pulled taught over a looped structure 34 and attached thereto using one or a combination of attaching methods such as ultrasonic welding techniques, staples, adhesives or the like. The looped structure 34 is formed from plastic or thin sheet metal having rounded edges. The looped structure 34 has a shape designed to be fittingly received within the cavity 26 defined by the position of the slot 20 of the inner door panel 18 relative to the proximal end 24 of the armrest panel 16. The looped structure 34 has a cross section with an edge extending normal to the body as shown in FIGS. 3 and 4. The looped structure 34 has a continuous wall 35 bounding an area, wherein the continuous wall includes a first wall portion 35a integrally formed to a second wall portion 35b. The first wall portion 35a has an upper peripheral edge 37a and the second wall portion 35b has a lower peripheral edge 37b. The upper peripheral edge 37a bounds the lower peripheral edge 37b. The lower peripheral edge 37b bounds an area symmetrical to the opening of the cavity 26. The flexible skin 28 is mounted onto the upper peripheral edge 37a of the looped structure. A portion of the lower peripheral edge 37b of the looped structure 34 is attached to the proximal end 24 of the armrest panel 16 and the remaining portion of the lower peripheral edge 37b is mounted into the slot so as to mount the looped structure 34 with the flexible skin 28 over the cavity 26. A planar surface formed by the edges of the looped structure 34 is pressed up against the flexible skin 28, such that the flexible skin 28 is squeezing the perimeter of the looped structure 34 and is attached thereto. The looped structure 34 having the attached flexible skin 28 is then inserted into the slot 20 at one end, and received by the proximal end 24 of the armrest panel 16 on the opposite end. FIG. 4 shows a screw securing the looped structure 34 to the hidden surface 38 of the inner panel of the door 12 and the proximal end 24 of the armrest panel 16. However, the manner in which the looped structure 34 is attached thereto is not material to the operation of the armrest. Accordingly it is anticipated that other means of attaching the looped structure 34 having the skin to the inner panel are available and more appropriate depending upon the material of the skin and looped structure 34. For instance, if the looped structure 34 is made of plastic and the skin is made of vinyl, ultrasonic welding would be possible.

Figure 5:
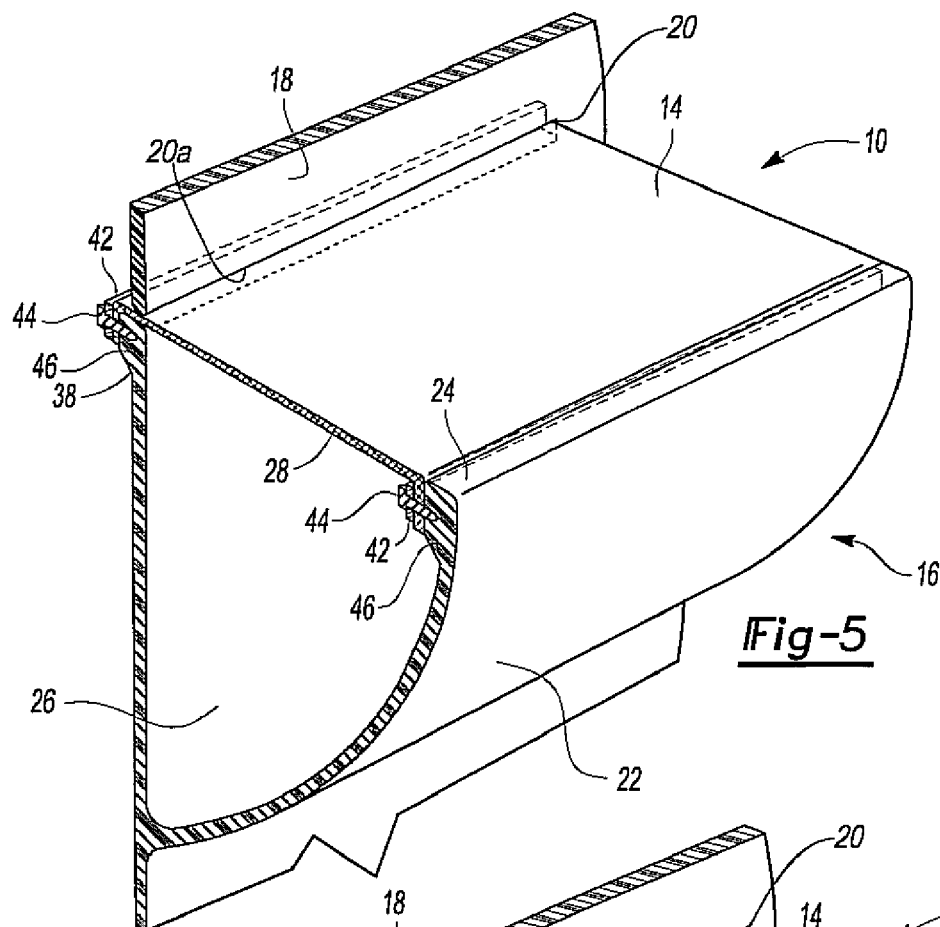
FIG. 5 is a perspective view of the armrest assembly having a pair of backing members.

With reference to FIG. 5, a pair of backing members 42 may be used in lieu of the looped structure 34 to ensure that the predetermined tension of the flexible skin 28 is maintained. The backing members 42 are long rigid members having a mounting surface. Each backing member 42 and is attached along the portion of the hidden surface 38 of the inner door panel 18 having and proximal end 24. The mounting surface of each backing member 42 is pressed onto the flexible skin 28 such that the flexible skin 28 is squeezed between each backing member 42 and the portion of the hidden surface 38 of the inner door panel 18 and the proximal end 24 of the armrest panel 16. A fastening device 44, such as a staple, screw, nail, bracket or the like may be used to attach the backing member 42 to an emboss 46 disposed on the hidden surface 38 of the inner door panel 18, and the proximal end 24 of the armrest panel 16. Alternatively, the backing members 42 may be ultrasonically welded to the flexible skin 28, or fixed thereto by using an adhesive.

Figure 6:
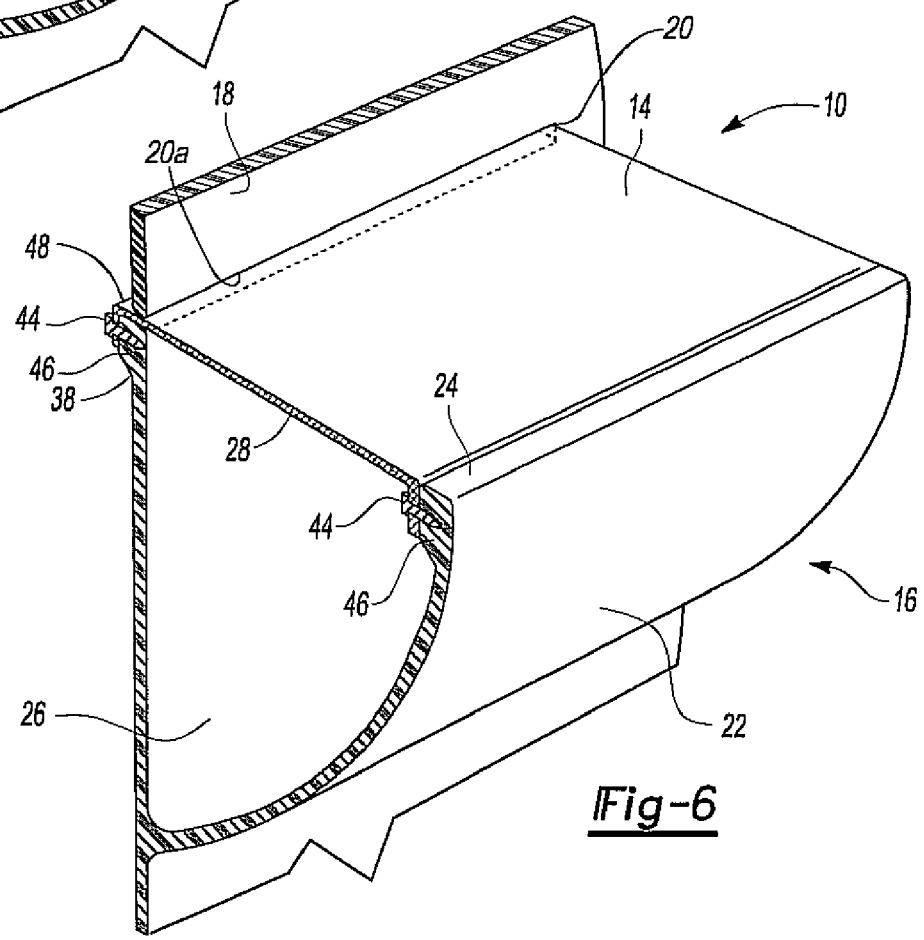
FIG. 6 is a perspective view of the armrest assembly wherein the flexible skin is attached directly to the inner door panel and the armrest panel.

It is also anticipated that the flexible skin 28 may be mounted to the armrest panel 16 directly as shown in FIG. 6. In such an embodiment, the flexible skin 28 is attached to the proximal end 24 of the armrest panel 16 and stretched over the cavity 26 to achieve a predetermined tension and then inserted into the slot 20. The free end portion 48 of the flexible skin 28 extending beyond the slot 20 is then folded onto the hidden surface 38 of the inner door panel 18 and attached thereto. The flexible skin 28 can be made of fabric, leather, or vinyl and is attached to the hidden surface 38 of the inner door panel 18 and the proximal end 24 of the armrest panel 16 using any of the attachment methods described above. Thus the flexible skin 28 forms the supporting surface for an occupant's arm. The predetermined tension of the flexible skin 28 is such that the load of an occupant's arm can be sustained without unwanted sagging of the flexible skin 28. If a staple, screw or other similar fastening device 44 is used, an emboss 46 may be formed on the hidden surface 38 of the inner door panel 18 adjacent the slot 20 and the proximal end 24 where the skin is attached thereto. The emboss 46 provides space for staple, screw or other similar fastening device 44 to be seated therein without protruding into the interior cabin space of the vehicle.

It is anticipated that the flexible skin 28 may be joined with a sheet material to provide additional support and feel of softness to the support surface 14. The sheet material illustratively includes elastomeric foam, polymer resin, soft plastic, leather, polymeric gel, cotton, and any combination thereof. The flexible skin 28 may be laminated, heat treated, or the like to the sheet material described above. The sheet material may further include a sensory element including a healing element, a messaging element, or a fragrance element. The armrest may further include a mass of high-density cushion underneath the flexible skin 28 to provide added support for the suspended surface.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

I claim:

1. An armrest assembly for a vehicle door, the vehicle door having an inner door panel, the inner door panel having an inner wall surface and an outer wall surface, the armrest assembly comprising:

an armrest panel mounted to the inner wall surface of the inner door panel, the armrest panel having a proximal end, the proximal end being spaced apart from the inner door panel to define a cavity; and a flexible skin made of a sheet of flexible material, and wherein one end of the flexible skin is attached to the proximal end of the armrest panel and the other end of the flexible skin is attached to the inner door panel, and wherein the flexible skin extends across the opening of the cavity along a generally horizontal place so as to be in communication with the opening of the cavity, and wherein the flexible skin extends along a generally horizontal plane over the cavity so as to form a support surface for supporting the load of a passenger's arm.

2. The armrest assembly of claim 1, wherein the inner door panel further includes a slot, the slot having an inner peripheral edge, the slot being spaced apart and parallel to the proximal end of the armrest panel, wherein the flexible skin is mounted within the slot and a portion of the flexible skin is folded about a portion of the inner peripheral edge and fixed to the outer wall surface of the inner door panel.

3. The armrest assembly of claim 1, wherein the armrest panel is integral to the inner door panel.

4. The armrest assembly of claim 1 further comprising a pair of backing members, wherein one backing member is attached to the inner door panel so as to squeeze a portion of the flexible skin against the outer wall surface of the inner door panel, and wherein the other backing member is attached to the proximal end of the armrest panel so as to squeeze a portion of the flexible skin against the inner door panel.

5. The armrest assembly as set forth in claim 2, further including a first and second emboss, wherein the first emboss is disposed on the outer wall surface of the inner door panel adjacent the slot and wherein the second emboss is disposed on the armrest panel adjacent the proximal end, wherein one end of the flexible skin is mounted to the second emboss, and the other end of the flexible skin is extends though the slot and is mounted to the first emboss.

6. The armrest assembly as set forth in claim 2, further including a looped structure, the looped structure having a continuous wall bounding an area, wherein the continuous wall includes a first wall portion integrally formed to a second wall portion, the first wall portion having an upper peripheral edge and the second wall portion having a lower peripheral edge, wherein the upper peripheral edge bounds the second wall portion, and wherein the flexible skin is mounted onto the upper peripheral edge of the first wall portion, and wherein a portion of the lower peripheral edge is attached to the proximal end of the armrest panel and the remaining portion of the lower peripheral edge is mounted into the slot so as to mount the looped structure and flexible skin over the cavity.

7. The armrest assembly as set forth in claim 6, wherein the looped structure is formed from plastic or a sheet metal.

* * * * *

UNITED STATES PATENT AND TRADEMARK OFFICE
CERTIFICATE OF CORRECTION

PATENT NO. : 7,681,939 B2
APPLICATION NO. : 12/103422
DATED : March 23, 2010
INVENTOR(S) : Nicholas H. Augustyn It is certified that error appears in the above-identified patent and that said Letters Patent is hereby corrected as shown below:

Column 5, line 38 replace "healing" with --heating--

Signed and Sealed this

Thirty-first Day of August, 2010

David J. Kappos
*Director of the United States Patent and Trademark Office*